Feb. 27, 1934.        J. W. MACE        1,948,586
ANIMAL TRAP
Filed June 15, 1932        3 Sheets-Sheet 1
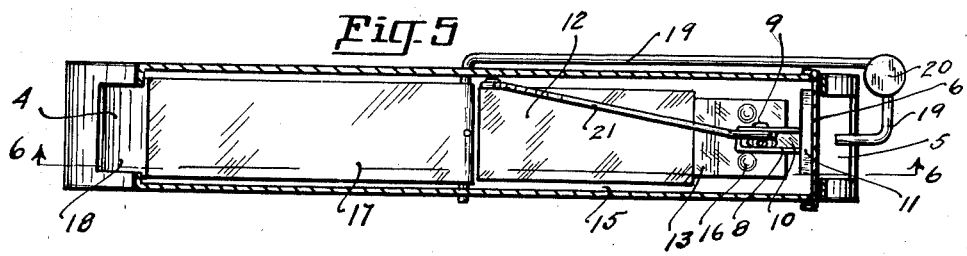
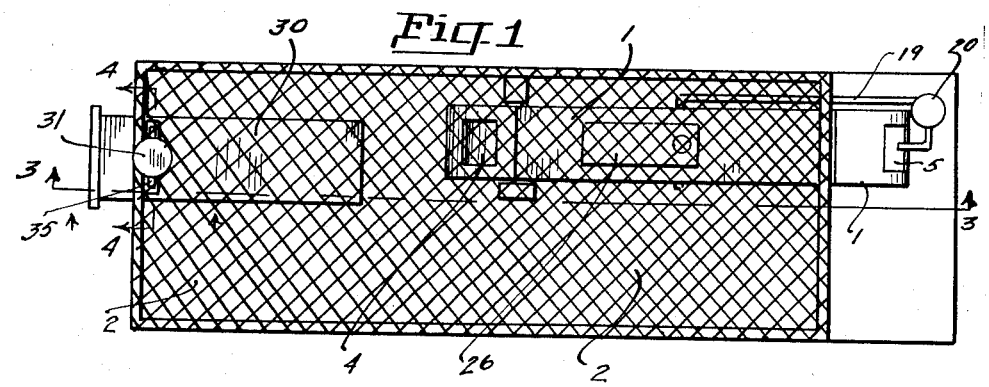
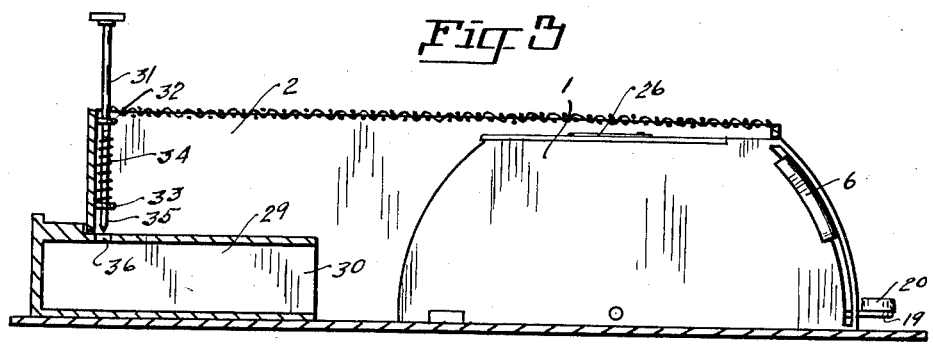
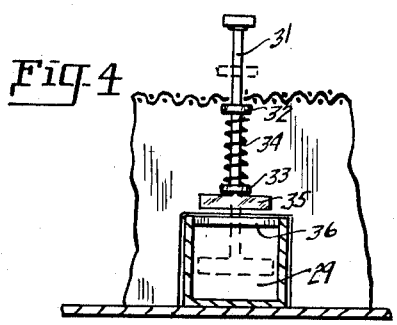 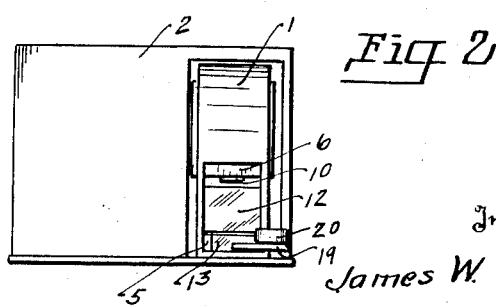
Inventor
James W. Mace
By Thomas Bilyeu
Attorney

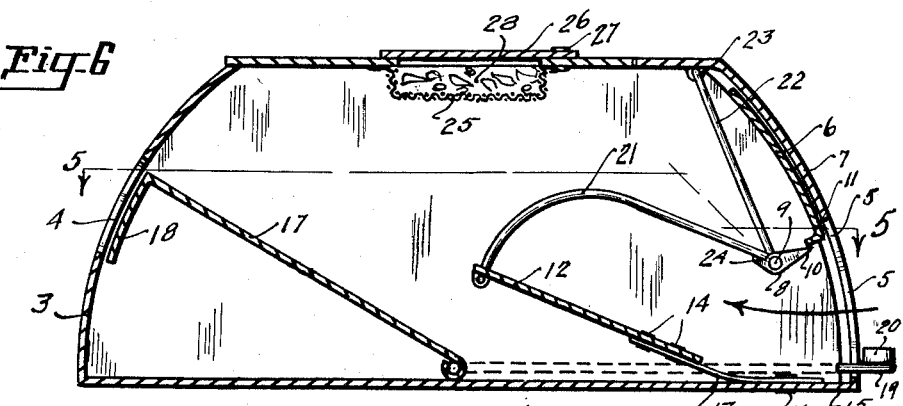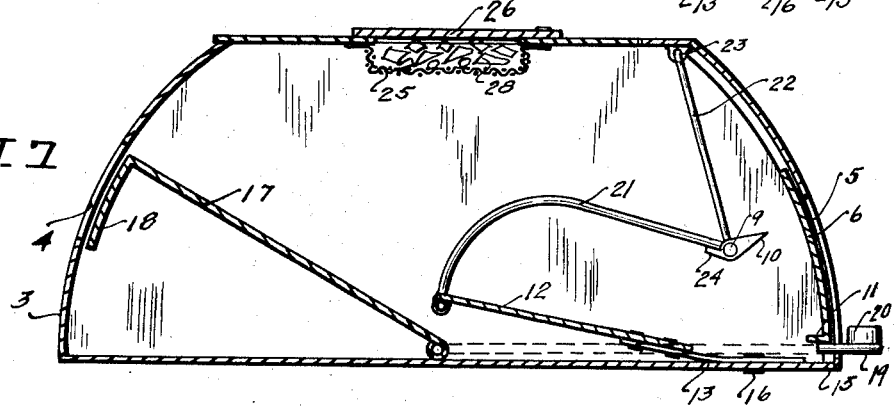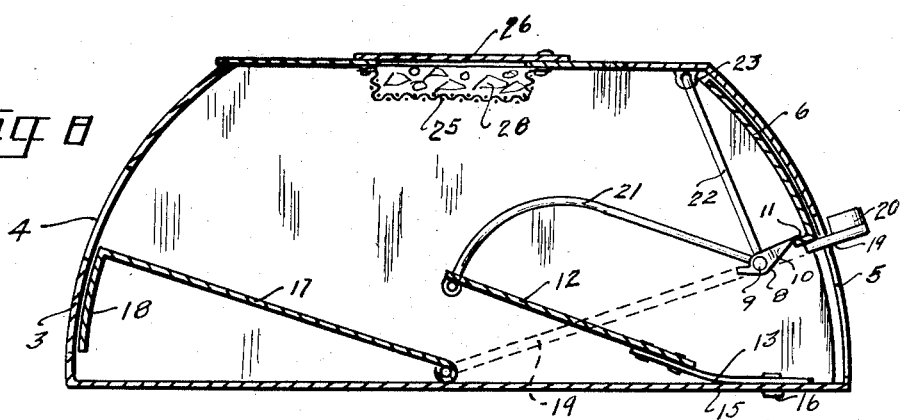

Feb. 27, 1934.  J. W. MACE  1,948,586
ANIMAL TRAP
Filed June 15, 1932   3 Sheets-Sheet 3
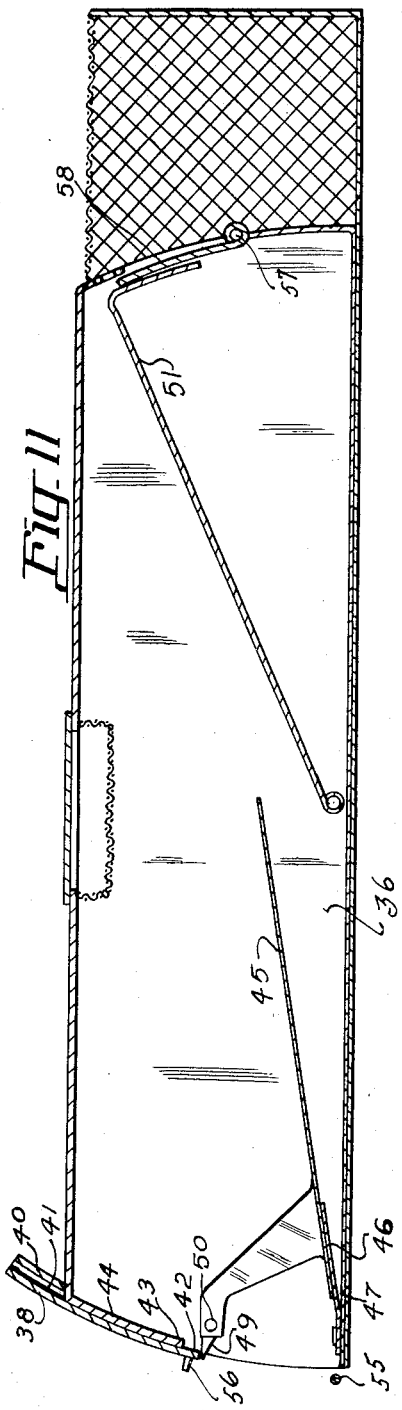
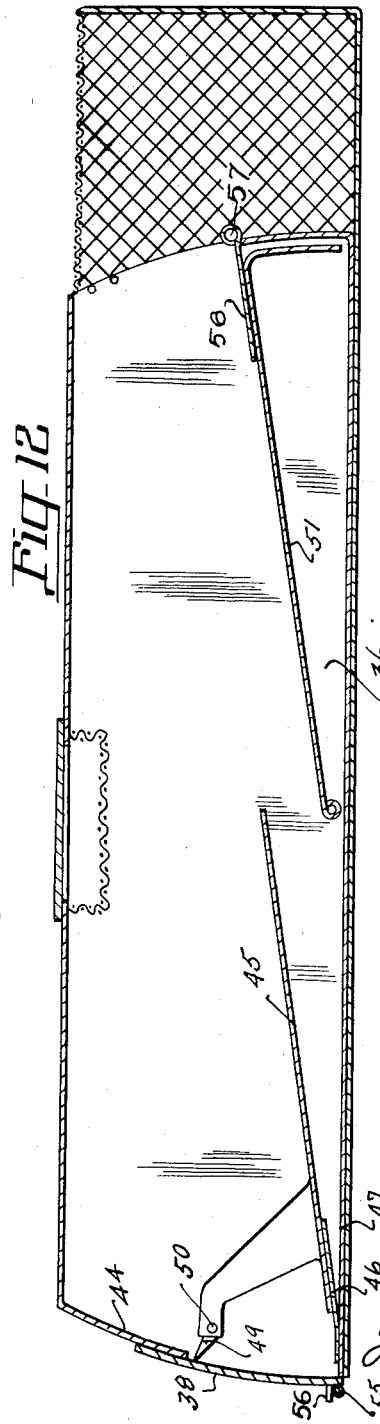
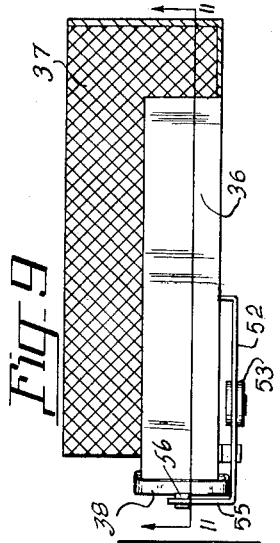
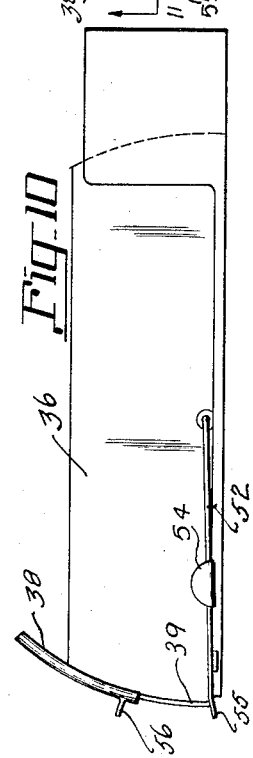
Inventor
JAMES W. MACE
Attorney Patented Feb. 27, 1934

1,948,586

UNITED STATES PATENT OFFICE 1,948,586

ANIMAL TRAP

James W. Mace, Rainier, Oreg., assignor of one-half to Amos O. Wing, Rainier, Oreg.

Application June 15, 1932. Serial No. 617,439

2 Claims. (Cl. 43—76)

My invention relates to animal traps and is comprised primarily of a cage, through which the animal to be trapped enters to secure the bait disposed therein, and a trapping pen disposed adjacent the cage. The cage and the pen being separated by a partition.

An entrance way is disposed through the side wall of the cage and an exit way is disposed between the wall that separates the cage and the pen.

A movable shutter is adapted for closing and opening the entrance way, and the exit way is adapted for being opened and closed by a closure plate secured to the movable end of the inclined surface. A counter weight is secured to the inclined surface and normally maintains the inclined surface elevated and the exit way closed.

The animal to be trapped is required to pass over a trigger that is in registerable alignment with and adapted for maintaining a locking latch, so positioned as to maintain the shutter elevated and the entrance way open.

A bait holder is disposed and secured to the inner surface of the top of the cage. The bait holder is adapted for being filled and, or the bait, removed through a normally closed opening disposed through the wall of the cage.

A box is disposed within the trapping pen having side walls a top wall and one end wall into which the trapped animal rushes.

A spear is adapted for being lowered into the box and for killing the animal trapped therein. The executed animal may be ejected from the box by the removal of the box from the trapping pen.

One of the objects of my invention is to provide an animal trap that may be used in the trapping of a number of animals, or a whole litter, by trapping one of the animals at a time therein.

A further object of my invention consists in providing an animal trap, through the use of which the trapped animal may be killed expeditiously and with the least annoyance to the user of the trap.

A still further object of my invention consists in producing a trap that is automatic in its operation and the trapping pen of which has an entrance and an exit way leading thereinto and therefrom, and gates of each of the openings being adapted for being automatically actuated by the trapped animal after the same is first hand set.

In the drawings:

Fig. 1 is a top, plan view of the assembled device.

Fig. 2 is a front, end view of the assembled device.

Fig. 3 is a sectional, side view of the assembled device. The same is taken on line 3—3 of Fig. 1, looking in the direction indicated.

Fig. 4 is a fragmentary, sectional end view of the assembled device, the same being taken on line 4—4 of Fig. 1, looking in the direction indicated.

Fig. 5 is a sectional, plan view of the mechanism illustrated in Fig. 6, the same being taken on line 5—5 of Fig. 6, looking in the direction indicated.

Fig. 6 is a sectional, side view of the mechanism illustrated in Fig. 5, the same being taken on line 6—6 of Fig. 5, looking in the direction indicated.

In Fig. 6, the animal trap is shown set with the entrance way open and with the exit way closed.

Fig. 7 is a sectional, side view of the mechanism illustrated in Fig. 6, and illustrating the trap as having been sprung and the animal trapped within the trap body.

Fig. 8 is a sectional, side view of the mechanism, illustrated in Figs. 6 and 7. In this view the entance and exit ways are both shown as being open.

Fig. 9 is a top, plan view of a modified form of the device.

Fig. 10 is a side view, of the device illustrated in Fig. 9.

Fig. 11 is a sectional, side view, of the device illustrated in Fig. 9. This view is taken on line 11—11 of Fig. 9, looking in the direction indicated. In this view the entrance door is shown open and the exit door is shown closed.

Fig. 12 is a side view, of the same mechanism, but illustrating the entrance door as being closed and the exit door as being open.

Like reference characters refer to like parts throughout the several views.

I preferably form my device as being composed of a cage body element 1 and a trapping pen 2 disposed adjacent thereto. A wall 3 normally separates the trapping pen from the cage body element. An exit passageway 4 is disposed through the wall 3 and through which the trapped animal passes from the cage to the trapping pen. An entrance way 5 is disposed through the entrance end of the cage pen. A shutter 6 is adapted for being raised and lowered adjacent the front wall 7 of the cage pen and for opening the entrance way when the shutter is raised and for closing the entrance way when the shutter 6 is lowered.

A locking latch 8 is hinged about a journal pin 9. The front end 10 of the locking latch is adapted for being engaged beneath a projecting lug 11 of the shutter and for maintaining the shutter raised when the locking latch is engaged thereunder.

A trapping trigger 12 is held normally raised through the action of a reacting element, as a flat spring 13. The flat spring 13 is secured to the trigger 12, as by being riveted thereto by rivets 14, and the spring is secured to the bottom 15 of the trap, as by being riveted thereto by a rivet 16.

When the animal to be trapped enters the trap through the entrance way 5, the trigger 12 is lowered. In doing so, the locking latch 8 is disengaged from the lug 11 and the shutter is permitted to fall by gravity and to close the entrance way. The animal thus trapped within the cage engages the inclined surface 17. A closure 18 is normally maintained in position to close the exit way 4, through the action of the arm 19 and the counterweight 20. The weight of the animal upon the inclined surface 17 lowered the entrance way and the closure 18, and permits the animal to emerge through the exit way 4 into the trapping pen 2. After the trapped animal has stepped off of the inclined entrance way 17, the counterweight 20 returns the hinged inclined surface to its normal raised position, and for closing and for normally maintaining the exit way 4 closed.

The trigger 12 has an arm 21 secured thereto upon one end of the arm. The oppositely disposed end of the arm is secured to a supporting trigger control 22. The trigger control 22 is hingedly secured to a lug 23, and about which the locking latch 8 is hinged.

To set the trap the shutter 6 is raised to open the entrance way and the free end of the locking latch is made to engage the underside of the lug. The locking latch is made heavy on its one side. When the shutter is raised thereupon and when the same is in initial set position, a finger 24 is made to engage the arm 21.

When the animal has stepped upon the trigger 12, the locking latch is made to disengage the lug 11 which permits the shutter 6 to fall. When the trapped animal has stepped upon the inclined surface 17 and lowers the same, the counterweight 20 is raised, and in doing so, the shutter 6 is raised to open the entrance way.

In the event that the animal turns around and steps upon the trigger 12 the shutter is again unlatched and the entrance way is closed.

A bait holder 25 is disposed central of the top about which the closure is rotatable and a closure 26 is placed thereabove. A fastening pin 27 is provided, to permit the change and removal of the bait 28, disposed within the bait holder.

The trapping pen 2 has a box 29 disposed therein. The box 29 is covered on all sides so that the trapped animal will enter the box through the end 30 and hide within the box 29.

A spear 31 is carried within guideways 32 and 33 and is normally held raised through the action of the reacting element 34 with the piercing point 35 held raised, clear of the box 29. An opening 36 is disposed in the top surface of the box and in registerable alignment with the spear 31.

When the trapped animal enters the box it may be exterminated by the pressing of the spear. The box may be moved from the trapping pen and the killed animal be removed without touching the carcass with the hands of the user.

In Figs. 9 to 12 inclusive I have shown a modified form of my new and improved animal trap. In this view the body 36 of the trap, is shown made of sheet material and the trapping pen 37 is shown made from mesh material, the body of the trap has top, bottom, end, and side walls made of sheet material. The top is hinged along one side to facilitate entry into the trap and to facilitate the maintaining of the same in a sanitary condition.

The entrance door 38 is adapted for being raised and lowered in relationship to the side walls of the body element. I outwardly extend a ledge 39 at the outer end of the side wall and form a reverse bend 40 at the side wall of the entrance to provide a slot 41 into which the ledge of the flange 39 is adapted to move. A stop lug 42 inwardly extends adjacent the lower edge of the entrance door which contacts with the bottom 43 of the end wall 44 of the body element to thereby prevent the accidental removal of the entrance door from the placement.

A false bottom 45 is hinged relative to the bottom of the trap. This may be accomplished by the placing of a flat spring 46 at the entrance end of the trip 45. The flat spring is secured on its one end to the trip and it is secured upon its oppositely disposed end to the bottom 47 of the body element. An arm 48 upwardly extends at one side of the trip 45 and a trigger 49 is hingedly secured to the arm by a hinge pin 50. When the animal to be trapped steps upon the trip 45 the weight of the animal lowers the trip sufficiently to disengage the trigger 49 from the door, and the entrance door closes through the action of gravity. A second false bottom trip 51 is disposed within the body element and is normally maintained in a raised position through the action of a counterweighted arm 52. A counterweight 53 is disposed upon the arm and is adapted for being adjustably positioned along the arm and for being locked to the arm through the action of the set screw 54. The arm 52 terminates in a lifting finger 55 that is disposed transversely of the entrance end of the door 38 and the finger 55 is normally disposed beneath the lift lug 56 disposed at the bottom of the door. When the trap is set the entrance door is raised and held raised through the action of the trigger 49. The weight of the door and the spring maintains the false bottom trip 45 raised. The counterweighted arm 54 is in full lowered position and the false exit bottom trip 51 is normally raised through the action of the counterweight.

After the animal has entered the trap and the entrance door is automatically closed the animal enters upon the exit false bottom trip 51 and the weight of the same lowers the exit trip and simultaneously raises the lifting finger 55 and sets the trap by raising the entrance door 38. In the event that the animal reverses its position and again steps upon the false bottom trip 45, the entrance door will again be automatically closed.

A flipper exit door 56 is hingedly disposed about a supporting pin 57 and the same is inclined toward the entrance door sufficiently so that as the exit false bottom trip is lowered the trip door 56, through the action of gravity, is lowered sufficiently to permit the trapped animal's escape through the exit door 58 into the trapping pen 37. The stepping of the trapped animal from the false bottom trip 51 permits the counterweight to again raise the exit false bottom top 51 into raised position and to close the flipper exit door 56 and to maintain the trapped animal in the pen 37.

What I claim is:

1. In a device of the class described, the combination of a cage formed of wire mesh, a trapping pen disposed within and at one end of the cage and forming one end wall thereof, an entrance-way formed through the end wall of the trapping pen and a door adapted to be closed by gravity arranged adjacent said entranceway, a platform yieldingly mounted on the floor of the cage, an arm secured to the outermost end of the platform and extending forwardly with respect thereto, a trigger carried by the free end of said arm and adapted to normally maintain the door in raised position and adapted to release the door when weight is applied to the platform, a second platform hingedly mounted on the floor of the trapping pen in advance of the first mentioned platform and formed with a downwardly extending apron, said trapping pen having an opening in the opposite end wall adjacent the path of movement of the second platform and said apron, an arm secured to the second platform and extending forwardly therefrom to a point outside the opposite end of the trapping pen, weighted means secured to the outermost end of said arm, and said outermost end of said arm terminating at a point beneath the lower edge of said door, so that normally the apron is held across the second opening until weight is applied to the second platform at which time the said second opening is uncovered by the downward swing of the second platform and at the same time its forwardly extending arm lifts the first mentioned door clear of the entranceway, said trigger being adapted to hold the door in lifted position.

2. In a device of the class described, the combination of an elongated cage formed of wire mesh, a trapping pen disposed within the cage and arranged so that one of its end walls forms one end wall of the cage, an entrance-way formed in the end wall of the trapping pen, a sliding door adapted to be lowered by gravity to close said entrance-way, a platform yieldingly extending upwardly from the floor of the trapping pen and provided with an arm carrying a trigger adapted to normally extend beneath the lower edge of said door to maintain the door in raised position, said trapping pen having an opening in its opposite end, a second platform hingedly mounted on the floor of the trapping pen and formed with a downwardly extending apron to normally extend across said opening, an arm extending forwardly from the second platform and terminating beneath the first mentioned door to raise said door upon application of weight to the said second platform, and a tunnel closed at one of its ends and extending through the opposite end of the cage, said tunnel having a slot in its upper wall, a rod slidably extending through the top of the cage and terminating in a blade normally positioned above the slot and adapted to be thrust downwardly therethrough to the bottom of the tunnel.

JAMES W. MACE.